United States Patent Office

Re. 26,843
Reissued Mar. 31, 1970

26,843
PROCESS FOR THE MANUFACTURE OF PHOSPHATE PELLETS

Hans-Werner Ziegler, Werner Kowalski, and Arnulf Hinz, Knapsack, near Cologne, Germany, assignors to Knapsack Aktiengesellschaft, Knapsack, near Cologne, Germany, a corporation of Germany No Drawing. Original No. 3,345,443, dated Oct. 3, 1967, Ser. No. 380,912, July 7, 1964. Application for reissue Jan. 15, 1969, Ser. No. 798,246
Claims priority, application Germany, July 8, 1963, K 50,157; May 6, 1964, K 52,883
Int. Cl. C01b *25/30*
U.S. Cl. 264—117 8 Claims

Matter enclosed in heavy brackets [ ] appears in the original patent but forms no part of this reissue specification; matter printed in italics indicates the additions made by reissue.

*ABSTRACT OF THE DISCLOSURE*

*A method of preparing phosphate pellets in which phosphate crude powder is sprayed with a suspension of alkali metal phosphate, alkali metal silicate as a binder, bentonite clay, and phosphate dust from electro filter waste gas. The mixture is then shaped to pellet form on a granulating plate and the formed pellets dried or baked.*

The present invention is concerned with a process for making pellets from crude phosphates intended for subsequent reduction to elementary phosphorus in an electrothermal reduction furnace. The invention is also concerned with the preparation of the suspensions necessary for making the phosphate pellets.

Normal operation of large electric reduction furnaces and high space/time yields are substantially influenced by the use of an appropriate furnace charge.

The furnace charge in general comprises coke, gravel and phosphates as individual constituents, of which more than 80% appear therein in a grain size of about 15 to 25 mm. possess good abrasion resistance and good compression strength, and are free from fines and dust. The water contents should not exceed 0.5% by weight.

Crude lump phosphates require prior drying and calcination for treatment in electrothermal furnaces having a power input of more than 30,000 kw. In addition, the minimum lump size should not fall below about 10 mm. in diameter and the bulk of the phosphates should have a grain size within the range of 15 to 20 mm. When present in fine grain form, the phosphates must also first undergo agglomeration so as to form pellets, which are then successively dried or sintered, or at least hardened at high temperatures.

Fine grain phosphates are preferably caused to agglomerate on a granulating disk or plate, e.g. with an apparatus of the type disclosed in German Patent No. 1,032,720, which substantially comprises a cylindrical dish rotatable around its axis. As against other granulating means this type of apparatus offers the advantage of permitting adaptation to the specific properties of the crude phosphate powders to be treated by modifying its speed of rotation and the angle of its axis of rotation with respect to the horizontal line, and by providing special disk inserts, such as a scraper, powder-applying means and atomization means.

Every crude phosphate possesses specific granulating properties which are determined by its origin and the conditions employed during preparation. The selection of optimal operating conditions, e.g. specific adjustment of the granulating plate with respect to its angle of inclination and speed of rotation, specific grain composition of the crude phosphate powder and use of an appropriate binder in the pelletizing water, will result in optimal granulating conditions for each phosphate grade.

It has now been found that decisive criticality not only resides in the above working conditions but also in the binder suspension employed for making the phosphate shapes for use in electrothermal reduction furnaces.

In the preparation of phosphate pellets by shaping crude phosphate in powder form on a granulating disk, followed by calcination of the pellets on a traveling grate, the binders in the binder suspension are intended to enable rapid formation of so-called "green" pellets having a given size and high strength permitting transport thereof to the calcining step without the pellets being subjected to deformation or destruction of undesired abrasion resulting in the formation of fines. Furthermore, the binders admixed with the crude phosphate powder are intended to lute the single particles inside the pellets during the following drying and calcining steps, so as to obtain shapes having an average compression strength of 80 to 100 kg. normally required for use in an electric phosphorus reduction furnace.

The binders are incorporated with the suspension constituents so as to produce an externally dry and stable pellet on the granulating disk and so as to obviate agglutination and deformation inside the material piled up on the grate on charging the pellets to the grate.

It is known that the agglomeration of fine-grained substances calls for the addition of binders in solid, molten or dissolved form so as to confer upon the agglomerate the strength necessary for its ultimate use. More especially, it is known to use binders such as alkali metal silicates, alkali metal phosphates and sulfite waste liquors, for causing phosphates to agglomerate. The alkali metal phosphates may be employed in the form of an aqueous solution of monosodium phosphate, disodium phosphate and trisodium phosphate, in the form of a pyrophosphate, tripolyphosphate, trimetaphosphate and tetrametaphosphate, in the form of high-polymerized phosphates or in the form of a mixture of such compounds. The same applies to the corresponding potassium salts. The above alkali metal phosphates serving as the binders may be introduced into the agglomerate in the form of existing compounds. Alternatively, the agglomerate may be admixed, e.g. with phosphoric acid and sodium chloride or sodium carbonate, which are used in determined quantitative ratios to enable the secondary formation of the desired impure alkali metal phosphates on heating the agglomerate at temperatures above 600° C.

Experiments have shown, however, that water alone having substances acting as a binder dissolved therein is insufficient for agglomerating phosphates, since the pellets so produced, dried and sintered have an unsatisfactory compression strength and merely withstand a breaking load of as low as 30 to 40 kg.

The present invention now provides an agglomerating process using specific binders.

It has unexpectedly been found that the granulating properties of most finely ground phosphate powder and the compression strength of phosphate pellets made therefrom can be substantially improved by spraying the crude phospshate powder placed e.g. on a granulating plate with a suspension of insoluble solids in water which also contains dissolved solids acting as a binder.

During the pelletizing step, the solid added in suspension occupies the interspaces left between the single grains in the "green" pellet and thus produces binder bridges which have been experienced to substantially accelerate the granulating process and to impart improved strength to the pellets after calcination.

When water-dissolved binders, e.g. alkali metal phosphates, alkali metal silicates, etc. are used alone, then the interfacial forces causing the "green" pellets to cohere are not available to the necessary extent due to the lack of solid matter. In this event, the solvent water in excess will evaporate during calcination, and the alkali metal salt, which crystallizes out in the pellet and partially melts, cannot occupy the interspaces in the pellet which thus fails to possess the necessary strength.

The phosphate powder is advantageously sprayed with an aqueous suspension of solid matter obtained in an electric dust removel installation of the type used for phosphorus furnace gases. This suspension, termed electrofilter dust suspension, is adjusted so as to contain approximately 25 to 30% by weight solid matter, the content of aqueous phase-dissolved alkali metal phosphates which are also included in the electrofilter dust being as high as up to about 5% by weight. The ratio of $Na_2O$ to $P_2O_5$ in the dissolved alkali metal phosphates averages approximately 1.3:1.

For preparing the phosphate pellets, the crude phosphate serving as the starting material is ground so as to contain fine grains having a grain size of less than about 0.1 mm. to an extent of about 75 to 75% by weight, preferably 75 to 80% by weight, or so as to contain fine grains having a grain size of less than about 0.06 mm. to an extent of 45 to 60% by weight, preferably 45 to 50% by weight, and while being sprayed with an aqueous electrofilter dust pulp it is shaped into pellets on a granulating plate e.g. of the type described in German Patent No. 1,032,720. The consumption of binder water can be calculated from the water content of the crude powder and the "green" pellets, and varies—as a function of the crude phosphate grade to be processed—between about 9 to 16% by weight, related to the weight of the pellets.

The electrofilter dust used for making the electrofilter dust suspension consists essentially of more of less prepared phosphates of the type obtained in electrothermal phosphorous production and separated from the furnace gas prior to condensing the phosphorous vapor in an electric gas-cleaning installation. The composition of the electrofilter dust depends essentially on the nature of the furnace charge and was determined, e.g. as follows, for a crude phosphate comminuted to be given grain-size:

| | Percent by weight |
|---|---|
| $P_2O_5$ | 33.5 |
| $SiO_2$ | 23.4 |
| $Al_2O_3$ | 2.9 |
| CaO | 16.2 |
| $Na_2O$ | 4.3 |
| $K_2O$ | 9.7 |
| $F_2$ | 3.1 |
| C | up to 5 |

and further contaminants.

The phosphate content of the electrofilter dust, calcuated as $P_2O_5$, may be distributed e.g. among the following compounds:

| | Percent by weight |
|---|---|
| Orthophosphates | 30 |
| Condensed phosphates | 70 |

Since sintered material, when used as the furnace charge, substantially reduces the amount of electrofilter dust obtained and also reduces the content of partially prepared phosphates to less than 15% by weight, the quantity of electrofilter dust obtained will not always be sufficient for pelletizing the phosphate powder.

It is, therefore, a further object of the present invention to use a bentonite suspension in addition to the electrofiler dust suspension for making phosphate pellets, the two suspension types being sprayed simultaneously but from different local sources onto the crude phosphate powder placed on the granulating plate, the electrofilter dust suspension being sprayed so as to deposit near the rim portion of the granulating plate, and the bentonite suspension being sprayed so as to deposit in the center portion thereof. In this manner, baked pellets having a less solid nucleus associated with a stable external shell were produced with the most economic use of valuable binders such e.g. as alkali metal phosphates.

Alternatively, a mixture comprising the electrofilter dust suspension and the bentonite suspension may be atomized onto the crude phosphate powder placed on the granulating plate.

In the above embodiments of the process of the present invention the bentonite pulp is prepared from water containing about 25 to 30% by weight bentonite while adding up to 2.5% by weight alkali metal phosphates, related to the aqueous solution, the ratio of $Na_2O$ to $P_2O_5$ in the alkali metal phosphates being approximately 1:1 to 1.3:1. The alkali metal phosphates include the waste products of the type obtained in polyphosphate and pyrophosphate production.

A further embodiment of the process of this invention for making phosphate pellets includes the use of an electrofilter dust suspension in combination with aqueous phosphate suspensions containing about 30% by weight phosphate and of the type obtained in wet dust removal in phosphate dressing.

Again, the above two suspensions may be sprayed separately but concurrently from two different local sources onto the crude phosphate powder placed on the granulating plate, the electrofilter dust suspension is advantageously sprayed so as to deposit near the rim portion of the granulating plate and the phosphate suspension being sprayed so as to deposit in the center portion thereof. Alternatively, a mixture comprising the electrofilter dust suspension and the phosphate suspension may be used, the latter suspension containing up to 2.5% by weight alkali metal phosphates having a $Na_2O$ to $P_2O_5$ ratio of about 1:1 to 1.3:1, which are admixed as additional suspension component.

It is also within the scope of this invention to use a working suspension containing electrofilter dust in addition to bentonite and phosphate suspensions of the type obtained in a wet dust removal installation and, optionally, waste products of the type obtained in the manufacture of condensed phosphates.

The alkali metal phosphates dissolved in the suspensions except the salts dissolved in the electrofilter dust suspension, are used in the form of sodium phosphates, i.e. in the form of metaphosphates, pyrophosphates, tripolyphosphates or higher-condensed phosphates. The suspension may be admixed with the single phosphates alone or with a combination thereof including waste products of the type obtained in the production of condensed phosphates.

In addition, alkali metal phosphates can be used which, during the hardening step following the agglomerating step, are transformed into higher-condensed compounds strengthening the pellets.

The process of the present invention substantially improves the granulating capacity and strength of both "green" and baked pellets. This is done by using a working suspension containing a relatively large proportion of emulsified solids in addition to dissolved binder as opposed to the conventional use of an aqueous solution of a suitable binder alone for pelletizing crude phosphates. Thus, for example, 15 to 25 metric tons per hour of phosphate powder, depending on the crude phosphate grade used, can be put through on a granulating plate 420 cm. in diameter for an average rate of 10 to 15 revolutions per minute. The resulting "green" pellets have a strength corresponding to a breaking load of 3 kg. After heating the green pellets at a maximum temperature of 900° C., however, the strength of the resulting baked pellets averages 95 kg. The increase in strength of the pellets is the result of occupying the interspaces formed by evaporation of the water upon heating the green pellets with the binder and the insoluble solid matter contained in the suspension. This results in the formation of binder bridges combining the single grains of the phosphate powder.

The binding power of the suspension is determined by the proportion of binders, for instance, present therein. The binders are bound to the extremely large surface area of finest dust and thus enable to display a multiple of their initial activity. Sedimentation of such finest dust is obviated by the bentonite which is added in a proportion adapted to the viscosity of the pulp, i.e. in a proportion so as to obtain a pulp of sprayable consistency. The combination of binder with filler substantially strengthens the adhesive and cohesive forces existing between the material to be granulated and the pelletizing water. The process of the present invention uses a pulp containing about 30% by weight solid matter and has a density of about 1.19 to 1.21. The solid matter consists of about 65 to 70% by weight clay or bentonite, about 20 to 25% by weight electrofilter dust of the type obtained in a cleaning installation used for furnace gases issuing in electrothermal phosphorus production, about 5% by weight finest phosphate dust of the type obtained in dust removal means used in phosphate dressing, and at least 2.5% by weight alkali metal phosphates which are added in solid form.

It has also been found that substantially smaller proportions of the relatively costly clay and solid alkali metal phosphate components can be employed in the suspension by increasing the solids content thereof, i.e. by increasing the proportion of finest dust of the type obtained as a waste product in phosphate dressing to about 40 to 45% by weight, of this 98% has a grain size smaller than 0.06 mm.

Apart from the clay and the alkali metal phosphates so saved, the resulting suspensions have improved binding power as compared with other suspensions. In other words, the crude phosphate powder can more rapidly be pelletized, and the resulting unbaked "green" pellets are found to have an improved stability of shape, resistant to plastic deformation during transport to the drying or baking chamber.

This stability of shape prevents the free cross-sectional areas of the sinter grate plates from becoming gradually obstructed, and simultaneously ensures a substantial increase in the free intervolume in the pellet layer on the grates. The large intervolume remaining in the pellets piled up enables, for small differential pressures, i.e. difference in pressure above and below the pellet layer, more pellets to be piled up; this ultimately enables the sintering process to proceed uniformly and in well-defined manner.

This latter method substantially comprises preparing the suspension or pulp necessary for making phosphate pellets, wherein an aqueous suspension, i.e., about 28 to 32% by weight of electrofilter dust coming from an off-gas cleaning installation of the type used for electrothermal phosphorus production is mixed with an aqueous solution containing about 1 to 2% by weight alkali metal phosphates. Optionally, the above may be mixed with scrubbing water containing about 2 to 5% by weight solid matter and obtained in a wet dust removal installation of the type used in phosphate dressing, the individual mixing components being used in a quantitative ratio so as to yield a preliminary suspension having a density of about 1.06 to 1.10. The ratio of alkali metal oxide to $P_2O_5$ of the phosphates dissolved in the alkali metal phosphate scrubbing water should preferably amount to 1:1 to 1.4:1. In this preliminary suspension, clay is suspended in a proportion such that the content of said matter of the resulting suspension amounts to about 20 to 25% by weight for a density of about 1.14 to 1.16. Fine phosphate dust is introduced into the prepared suspension until the resulting working suspension contains a total of 40 to 45% by weight solid matter; this corresponds to a density of about 1.30 to 1.32.

The aqueous alkali metal phosphate solution is preferably a solution of the type obtained by off-gas scrubbing in an installation used for making alkali metal phosphates. This solution contains condensed phosphates, such as pyrophosphates, tripolyphosphates, metaphosphates, or higher-condensed hosphates.

To characterize the nature of the present invention, there are specified in the following two types of suspensions prepared in accordance with the present invention, of which one has the typical composition A and the other one has the typical composition B.

| Preparation of preliminary suspension: | Amount in cubic meters |
|---|---|
| Rest working suspension in preparing vessel | 2 |
| Electrofilter dust suspension | 3 |
| Alkali metal phosphate scrubbing water (cf. note) | 9-x |
| Scrubbing water from wet dust removal means | x |
| Density: 1.06–1.10, solids. | |
| Content: 12–15% by weight. | |
| Total amount | 14 |

NOTE: The amounts of alkali metal phosphate scrubbing water used depend on the condensed phosphate content of the scrubbing water and are referred to the use of 75 to 100 kg. in about an 18 cubic meter suspension batch, i.e. the amount of scrubbing water used is so selected that 75 to 100 kg. condensed phosphates are applied per each 18 cubic meter suspension batch.

The specific gravity of the preliminary preparation is about 1.06–1.0 and the solids vary from 12–15% by weight of preparation.

PREPARATION OF WORKING SUSPENSION

| | Composition A, in cubic meters | Composition B, in cubic meters |
|---|---|---|
| Preliminary suspension, m.³ (see above) | 14.0 | 14.0 |
| Clay (18–20% by weight water), calc. on dry clay, kg | 4,150 | 2,550 |
| Solid alkali metal pyro- or poly-salts, kg | 250 | |
| Finest phosphate dust, kg | | 4,750 |
| Density of supsension | 1.21–1.80 | 1.30–1.32 |
| Solids content of suspensions (percent by weight) | 28-32 | 40-42 |
| Total amount, m.³ | 17.9 | 17.8 |

The process of the present invention for making phosphate pellets, wherein a finely ground crude phosphate powder is sprayed with an aqueous phosphate solution acting as binder and shaped on a granulating plate into green pellets which are successively dried, hardened and baked, comprises more especially spraying a suspension formed of most finely divided, solid and insoluble matter on the crude phosphate powder placed on the granulating plate. About 75–85% by weight of the crude phosphate powder is ground to a grain size of less than 0.1 mm. or about 45 to 60% by weight to a grain size of less than 0.06 mm., and shaped into pellets on the granulating plate through the use of a suspension or pulp of electrofilter dust in water, the electrofilter dust being of the type obtained from alkali metal oxide and $P_2O_5$ containing furnace gases issuing in the electrothermal production of phosphorus. The electrofilter dust suspension is then adjusted so as to contain about 25 to 30% by weight solid matter. The ratio of alkali metal oxide to $P_2O_5$ of the phosphates dissolved in the water is usefully within the range of about 1.1 to 1.3:1.

According to a further feature of the present invention the electrofilter dust suspension and a bentonite suspension are atomized concurrently onto the crude phosphate powder on the granulating plate, the electrofilter dust suspension being caused to deposit near the rim portion of the granulating plate and the bentonite suspension being caused to deposit in the center portion thereof. Alternatively, the bentonite and dust may be premixed and the suspension sprayed onto the crude phosphate powder on the granulating plate. The above bentonite suspension is prepared from water containing about 25 to 30% by weight bentonite and up to about 2.5% by weight alkali metal phosphates, related to the aqueous solution, to obtain a ratio of alkali metal oxide to $P_2O_5$ of about 1:1 to 1.3:1.

According to a further embodiment of the present invention an electrofilter dust suspension and an aqueous phosphate suspension containing about 30% by weight alkali metal phosphates, of the type obtained in a wet dust removal installation used in phosphate dressing can be atomized concurrently onto the crude phosphate powder on the granulating plate; in such case the electrofilter dust suspension deposits near the rim portion of the granulating plate and the phosphate suspension is deposited in the center portion thereof. Again, a mixture comprising the electrofilter dust suspension and the aqueous phosphate suspension can be used, the latter suspension containing up to about 2.5% by weight alkali metal phosphates, wherein the ratio, of alkali metal oxide to $P_2O_5$ is within the range of about 1:1 to 1.3:1.

The present invention also enables any combination of suspensions or pulps of electrofilter dust, bentonite or clay with phosphate suspensions, alkali metal phosphate solutions, etc., to be used. The alkali metal phosphates acting as a binder and added in the form of an aqueous suspension, pulp or solution are preferred as sodium phosphates, such as methaphosphates, pyrophosphates, tripolyphosphates or higher-condensed phosphates. These compounds may be used alone or in admixture with each other, including the waste products of the type obtained in the manufacture of condensed alkali metal phosphates. It is also found useful to employ alkali metal phosphates, e.g. monosodium phosphates and disodium phosphates during the hardening process following the agglomerating or pelletizing step. These compounds are transformed into compounds which strengthen the pellets.

A still further embodiment of the present invention comprises the preparation of the suspension used for making the pellets, wherein an aqueous electrofilter dust suspension of about 28–32% by weight is mixed with an aqueous solution containing about 1 to 2% by weight alkali metal phosphates and optionally mixed with scrubbing water containing 2 to 5% by weight solid matter and of the type obtained in a wet dust removal installation used in phosphate dressing. The resulting preliminary suspension has a density of about 1.06 to 1.10; clay is then suspended in the preliminary suspension to obtain a suspension containing about 20 to 25% by weight solid matter, the finest phosphate dust of the type obtained in a dust removal installation, especially in a dust removal installation of the type used in the grinding installation for phosphate dressing, is ultimately introduced into this suspension to obtain a working suspension containing 40 to 45% by weight solid matter. The above aqueous alkali metal phosphate solution is a solution of the type obtained by water-scrubbing of off-gases during alkali metal phosphate production, the resulting scrub solution containing condensed phosphates, e.g. pyrophosphates, metaphosphates and tripolyphosphates, or higher-condensed phosphates.

The following examples serve to illustrate the process of the present invention:

EXAMPLE 1

Electrofilter dust having a temperature of 200 to 250° C. was introduced directly from an electrofilter installation of the type used in thermal phophorous production into a given amount of water so as to obtain a suspension containing about 30% by weight solid matter. Grains having a diameter of more than 1 mm. were screened out, and the suspension was used for granulating crude phosphate powder. The suspension contained about 4 to 5% by weight alkali metal phosphate acting as a binder. More sintered phosphates, calculated on all the crude phosphate components of the charge introduced into the electric furnace, were experienced to impair the content of phosphates acting as a binder in the electrofilter dust suspension, so that it became necessary to additionally incorporate therewith minor proportions of alkali metal phosphate, e.g. waste product of the type obtained in poly-phosphate production, as a qualitative and quantitative function of the phosphate grade to be processed.

EXAMPLE 2

Electrofilter dust having a temperature of 200 to 250° C. was introduced directly from an electric dust removal installation of the type used for phosphorus furnace gases into a given amount of water and enriched therein so as to obtain a suspension containing about 30% by weight solid matter. 5 to 10% aqueous suspension obtained in a wet dust removal installation of the type used in electrothermal phosphorus production were simultaneously allowed to enrich in a settling basin so as to contain about 30% by weight solid matter. The two types of suspensions were mixed with one another in a given ratio, passed through a screen having meshes 1 mm. wide, and used for pelletizing. Sodium phosphates, e.g. in the form of waste products of the type obtained in the production of condensed phosphates were added to the working suspension, which was thereby adjusted so as to contain about 2.5 to 5% by weight sodium phosphate as a function of the crude phosphate grades to be processed.

EXAMPLE 3

A suspension container having a capacity of 17 cubic meters was charged with:

- 2.5 m.$^3$ electrofilter dust suspension containing 30% by weight solid matter,
- 3.5 m.$^3$ polyphosphate-containing scrubbing water having a density of 1.05 and obtained in an off-gas scrubbing means of the type used in condensed phosphate production,
- 2 m.$^3$ suspension containing 10% by weight solid matter and consisting of aqueous phosphate suspensions obtained in a wet dust removal installation of the type used in phosphate dressing, and
- 6 m.$^3$ water to make up for a total volume of 14 cubic meters.

While being intensely stirred, the suspension in the above container was further admixed portionwise with clay, which has been prepared in a circular screen feeder and formed into worms 8 mm. in diameter and 30 to 50 mm. long, until the suspension had a density of 1.17 to 1.18. Stirring of the suspension was continued and the density increased to a constant value of 1.19 to 1.21, the pulp then containing 29 to 30% by weight solid matter. The alkali metal content of the finished working suspension was adjusted to about 2.5 to 3.0% by weight by adding solid alkali metal polyphosphate or pyrophosphate.

"Green" pellets prepared in the manner described in Examples 1 to 3 with the use of binder suspensions containing 25 to 30% by weight solid matter and 2.5 to 5% by weight alkali metal phosphate for a $Na_2O$ to $P_2O_5$ ratio of 1.3:1 to 2:1 withstood breaking loads of 2.5 to 3.5 kg. These strength properties enable the pellets after removal from the granulating plate to be transported to the traveling or sintering grate without any abrasion fines being formed. By successive pre-drying of the pellets followed by hardening at temperatures increasing up to 900° C., the breaking load capacity of the pellets was increased to a mean value of 95 kg. Phosphate pellets having these strength properties can be used in largest units of electric reduction furnaces for making phosphorus.

EXAMPLE 4

An aqueous suspension of electrofilter dust obtained in a furnace gas cleaning installation of the type used in electro-thermal phosphorus production, the suspension having a density of 1.18 to 1.21, corresponding to a solids content of 28 to 32% by weight, was mixed with alkali metal phosphate scrubbing water of the type obtained in the off-gas scrubbing stage of phosphate production by a spray process, the scrubbing water having a density of 1.005 to 1.010 for a solids content of about 0.5 to 1.0% by weight, and optionally mixed with scrubbing water obtained in a wet dust removal installation of the type used in phosphate dressing and having a density of 1.02 to 1.05, corresponding to a solids content of 2 to 5% by weight. The individual mixing components were used in quantitative ratios such that the resulting preliminary working suspension had a density of 1.06 to 1.10. Swellable clay, e.g. bentonite, was suspended in the preliminary suspension so obtained until the density thereof had increased to 1.14 to 1.16 corresponding to a clay content of 20 to 25% by weight, related to the solids content of the suspension. For finishing the working suspension, the preliminary suspension was admixed with finest phosphate dust of the type obtained in phosphate dressing so as to obtain a density of 1.30 to 1.31. This corresponded to a 50 to 60% by weight proportion of finest phosphate dust, related to the total solids content of the suspension.

We claim:

[1. A process for making pellets comprising spraying finely ground crude phosphate powder on a granulating plate with a suspension consisting essentially of (1) an aqueous phase containing about 1–2% alkali metal phosphate binder in solution, and (2) a solids phase containing (a) about 28–32% by weight phosphorous production off-gas electrofilter dust, (b) bentonite clay added to obtain a suspension containing about 20–25% solid matter by weight and (c) fine phosphate dust as characterized by that obtained in dust removal devices in a grinding installation for phosphate dressing, to obtain a working suspension having a total of about 40–45% by weight solid matter; shaping the sprayed crude phosphate powder into green pellets, drying, hardening and baking the pellets.]

[2. The process of claim 1 wherein the suspension is further admixed with scrubbing water containing about 2 to 5% by weight solid matter as obtained in a wet dust removal installation used in phosphate dressing.]

[3. The process of claim 1 wherein the alkali metal phosphates in the aqueous phase is a solution of the type characterized by an off-gas scrubbing means of the type used in conventional alkali metal phosphate production the solution containing condensed phosphates.]

4. A process for making pellets comprising spraying finely ground crude phosphate powder with a suspension consisting essentially of (1) an aqueous phase containing at least one of (a) water soluble alkali metal phosphate, and (b) alkali metal silicate binders, and (2) finely divided solid material selected from the group consisting of bentonite clay, phosphate dust obtained by electrofilter dust removal from waste gasses in phosphorus production, fine phosphate dust characterized by dust recovered from wet dust removal installation in a phosphate dressing process; shaping the sprayed crude phosphate powder into green pellets, drying, hardening and baking the pellets.

[5. A process for making pellets comprising placing finely ground crude phosphate powder on a granulating plate and spraying with a suspension consisting essentially of (a) an aqueous suspension of electrofilter dust obtained in the removal of waste gasses in phosphorus production, (b) an aqueous phosphate suspension containing about 30% by weight alkali metal phosphates of the type characterized in a wet dust removal installation used in phosphate dressing, (c) and bentonite suspension, the suspensions being sprayed separately and concurrently into the crude phosphate powder, shaping the sprayed crude phosphate powder into green pellets, and drying, hardening and baking said pellets.]

[6. A process of claim 5, wherein the suspension of electrofilter dust is sprayed so as to deposit on the rim portion of the granulating plate and the bentonite suspension is sprayed to deposit on the center portion of the granulating plate.]

[7. A process of claim 5, wherein the suspension of electrofilter dust is sprayed to deposit onto the rim portion of the granulating plate and the aqueous phosphate suspension is sprayed to deposit onto the center portion of the granulating plate.]

[8. The process of claim 5, wherein a mixture of the electrofilter dust suspension and the aqueous phosphate suspension is used for spraying on the granulating plate, the aqueous phosphate suspension containing up to about 2.5% by weight alkali metal phosphates having a ratio of alkali metal oxide to $P_2O_5$ within the range of about 1:1 to 1.3:1.]

*9. A process for making pellets comprising spraying finely ground crude phosphate powder on a granulating plate with an aqueous working suspension prepared by*

*(1) mixing an aqueous suspension containing about 28–32% by weight of phosphorus production off-gas electrofilter dust with a sufficient amount of an aqueous solution containing about 1–2% by weight of alkali metal phosphate binder to obtain a preliminary suspension having a density of about 1.06 to 1.10;*

*(2) suspending into said preliminary suspension a sufficient amount of bentonite clay to obtain a composition containing about 20–25% by weight of solid matter, and;*

*(3) suspending into the said composition a sufficient amount of a fine phosphate dust characterized by that obtained in dust removal devices in a grinding installation for phosphate dressing to obtain a final working suspension having a total of about 40–45% by weight of solid matter;*

*shaping the sprayed crude phosphate powder into green pellets, drying, hardening and baking the pellets.*

*10. The process of claim 9 wherein the suspension is further admixed with scrubbing water containing about 2 to 5% by weight solid matter as obtained in a wet dust removal installation used in phosphate dressing.*

*11. The process of claim 9 wherein the alkali metal phosphates in the aqueous phase is a solution of the type obtained in off-gas scrubbing means of the type used in conventional alkali metal phosphate production, the solution containing condensed phosphates.*

*12. A process for making pellets comprising placing finely ground crude phosphate powder on a granulating plate and spraying with suspensions consisting essentially of*

*(a) an aqueous suspension of electrofilter dust obtained in the removal of waste gases in phosphorus production,*

*(b) an aqueous phosphate suspension containing about 30% by weight alkali metal phosphates of the type characterized in a wet dust removal installation used in phosphate dressing.*

*(c) and bentonite suspension,*

*the suspensions being sprayed separately and concurrently into the crude phosphate powder, shaping the sprayed crude phosphate powder into green pellets, and drying, hardening and baking said pellets.*

*13. A process of claim 12 wherein the suspension of electrofilter dust is sprayed so as to deposit on the rim*

*portion of the granulating plate and the bentonite suspension is sprayed to a deposit on the center portion of the granulating plate.*

*14. A process of claim 12 wherein the suspension of electrofilter dust is sprayed to deposit onto the rim portion of the granulating plate and the aqueous phosphate suspension is sprayed to deposit onto the center portion of the granulating plate.*

*15. The process of claim 12, wherein a mixture of the electrofilter dust suspension and the aqueous phosphate suspension is used for spraying on the granulating plate, the aqueous phosphate suspension containing up to about 2.5% by weight alkali metal phosphates having a ratio of alkali metal oxide to $P_2O_5$ within the range of about 1:1 to 1.3:1.*

References Cited

The following references, cited by the Examiner, are of record in the patented file of this patent or the original patent.

UNITED STATES PATENTS 2,946,112 7/1961 Tucker et al. -------- 264—117

FOREIGN PATENTS 617,337 3/1961 Canada.

ROBERT F. WHITE, Primary Examiner

J. R. HALL, Assistant Examiner